(12) United States Patent
Chan et al.

(10) Patent No.: US 7,590,693 B1
(45) Date of Patent: Sep. 15, 2009

(54) METHOD AND APPARATUS FOR RESTRICTION OF MESSAGE DISTRIBUTION FOR SECURITY

(75) Inventors: Kevin Chan, Ryde (AU); Neil Hepworth, Artarmon (AU); Stephane C. Laveau, Glebe (AU)

(73) Assignee: Avaya Inc., Basking Ridge, NJ (US)

( * ) Notice: Subject to any disclaimer, the term of this patent is extended or adjusted under 35 U.S.C. 154(b) by 1417 days.

(21) Appl. No.: 10/622,982

(22) Filed: Jul. 17, 2003

(51) Int. Cl.
*G06F 15/16* (2006.01)

(52) U.S. Cl. .............. 709/206; 709/205; 709/207; 715/752

(58) Field of Classification Search ......... 709/205–207; 715/752
See application file for complete search history.

(56) References Cited

U.S. PATENT DOCUMENTS

| | | | | |
|---|---|---|---|---|
| 5,619,648 | A * | 4/1997 | Canale et al. | 709/206 |
| 5,754,938 | A | 5/1998 | Herz et al. | 455/4.2 |
| 5,778,364 | A | 7/1998 | Nelson | 707/6 |
| 5,809,242 | A | 9/1998 | Shaw et al. | 395/200.17 |
| 5,870,548 | A | 2/1999 | Nielsen | 395/200.36 |
| 5,890,163 | A | 3/1999 | Todd | 707/200 |
| 5,905,777 | A | 5/1999 | Foladare et al. | |
| 5,923,848 | A | 7/1999 | Goodhand | 395/200.49 |
| 5,958,006 | A | 9/1999 | Eggleston et al. | |
| 6,032,258 | A | 2/2000 | Godoroja et al. | |
| 6,097,703 | A | 8/2000 | Larsen et al. | |
| 6,108,688 | A | 8/2000 | Nielsen | 709/206 |
| 6,118,856 | A | 9/2000 | Paarsmarkt et al. | |
| 6,134,582 | A | 10/2000 | Kennedy | 709/206 |
| 6,137,864 | A | 10/2000 | Yaker | 379/88.22 |
| 6,192,111 | B1 | 2/2001 | Wu | 379/88.13 |
| 6,199,106 | B1 | 3/2001 | Shaw et al. | 709/217 |
| 6,212,553 | B1 | 4/2001 | Lee et al. | 709/206 |
| 6,275,848 | B1 | 8/2001 | Arnold | 709/206 |
| 6,345,288 | B1 | 2/2002 | Reed et al. | |
| 6,442,600 | B1 | 8/2002 | Anderson | |
| 6,480,885 | B1 * | 11/2002 | Olivier | 709/207 |
| 6,654,779 | B1 * | 11/2003 | Tsuei | 718/101 |
| 6,678,361 | B2 | 1/2004 | Rooke et al. | |
| 6,684,239 | B1 * | 1/2004 | Flepp et al. | 709/206 |
| 6,782,079 | B2 * | 8/2004 | Skladman et al. | 379/88.13 |
| 6,854,007 | B1 | 2/2005 | Hammond | |
| 7,080,385 | B1 * | 7/2006 | Collison et al. | 719/318 |
| 7,093,025 | B1 * | 8/2006 | Gupta | 709/239 |
| 2002/0188689 | A1 * | 12/2002 | Michael | 709/206 |
| 2003/0065727 | A1 * | 4/2003 | Clarke et al. | 709/206 |

OTHER PUBLICATIONS

U.S. Appl. No. 10/076,382, filed Feb. 14, 2002, Awasthi.
"DCForum Administration User's Guide," Version 6, release 2, copyright 1997-2001, DCScripts release date Sep. 1, 2001.

(Continued)

*Primary Examiner*—Liangche Alex Wang
(74) *Attorney, Agent, or Firm*—Sheridan Ross P.C.

(57) ABSTRACT

A server for processing an electronic message is provided that includes:
(a) an input operable to a message inputted by a user, the message comprising one or more recipients, and a restriction identifier for the message, the restriction identifier identifying a subset of recipients from among a set of recipients to receive the message; and
(b) when a restriction identifier is received, a processor operable to tag the message with the restriction identifier.

42 Claims, 11 Drawing Sheets

OTHER PUBLICATIONS

"Letter dated Nov. 17, 2001," from Jonathan Leitner of MDY Advanced Technologies, Inc., to Thomas Bean of Avaya Inc.
Robinson, B., "E-Mail Overload," Federal Computer Week, reprinted with permission of FCW Government Technology Group, Inc., copyright 2001, 101 Communications, 213496.
Netscape Messaging Server Administrator's Guide, Chapt. 5, Managing the Message Store, http://home.netscape.com/eng/server/messaging 14.1.

* cited by examiner

METHOD AND APPARATUS FOR RESTRICTION OF MESSAGE DISTRIBUTION FOR SECURITY

FIELD OF THE INVENTION

The present invention relates to communication and distribution of messages and more particularly to a system for restricting message distribution for electronic and voice mail messages.

BACKGROUND OF THE INVENTION

Two of the most commonly used applications for delivering messages to individuals and groups are electronic mail (e-mail) and voice mail. E-mail refers to the transmission of messages, which may include further messages and/or files as attachments, by computer from one person to another person or group of persons. E-mail provides expedient connectivity and fast communication between network users. If a person is either unavailable or unwilling to pick up a message immediately, the message is stored until that person can review the stored message at a later time. E-mail messages also provide a quick and easy way to package information such as sales reports, graphics, and other data for transfer to another user or group of users by simply attaching the information to the message. Business users increasingly rely on e-mail messages to share ideas, transmit documents, schedule meetings, and perform a multitude of other everyday tasks.

In addition to e-mail, voice mail is a common feature in telephone systems used to deliver messages to a person or group of persons. Voice mail refers to messages which are transmitted through a telephone system to a person or group of persons. According to some estimates, 40% of all calls fail to result in a live connection, and are instead redirected to voice mail. The person placing the telephone call, referred to as the calling party, upon being redirected to voice mail, may leave a message for the called party, and the message is stored until that person can review the stored message at a later time.

As will be appreciated, both e-mail and voice mail messages commonly contain sensitive information, and message security is an important consideration for many companies and individuals. For this reason, e-mail and voice mail systems commonly require some type of authentication before a user is permitted to receive the messages. Such authentication may include entering a password or security code prior to accessing any messages. Unfortunately, users of such systems often select passwords or security codes which are not strong, and may be relatively easily broken. Furthermore, such systems commonly have an access point which users may connect to from remote locations in order to access messages. Such an access point provides an attractive target for unauthorized users. Relatively easy access to such systems, coupled with weak passwords, creates a situation where security of the system may be breached with relative ease.

For example, voice mail accounts are commonly created with a default security code which is used to access the account for a new user, which the user often does not modify. Accordingly, the security code for that user remains the default security code. An unauthorized person may access the voice mail system using a dial in number which may be used for remote access and, knowing the default security code for the system, enter this security code in an attempt to gain access to any messages contained therein for the user. This potential problem is accounted for in some systems, which require a user to enter a new security code when initially accessing the voice mail system. Some systems may also require users to change security codes periodically in order to limit aging of the codes. However, it is not uncommon for users of such systems to select security codes that may be easily guessed by an unauthorized person, such as the extension number of the user. Furthermore, in voice mail systems, security codes are generally limited to the symbols (namely 0-9, *, and #) which are contained on the standard telephone keypad. Thus, the options for security codes are limited to combinations of these symbols. Furthermore, the "*" and "#" symbols are often used to initiate special functions within the systems, and are thus not available for use in a security code. Accordingly, it would be beneficial to have additional security options in such a system which help reduce the probability of unauthorized access to sensitive information contained in the system.

Similarly as described above, email systems may have access points which a user may use to access email messages from remote locations. Also, users may select a password which may be relatively easily determined by an unauthorized person. A user may select the name of a family member as their password, for example. Thus, such an email system may also present an attractive target for an unauthorized person to gain access to sensitive information. Accordingly, it would be beneficial to have an email system which enhances the security of such message systems.

SUMMARY OF THE INVENTION

These and other needs are addressed by the various embodiments and configurations of the present invention. The present invention is directed to a restriction identifier for indicating a subset of recipients having authority to receive and/or otherwise access or redistribute an electronic message. The restriction identifier may indicate that a message recipient may only access the message from specified locations, such as locations internal to a network. The restriction identifier may also indicate that the electronic message has an age limit following either sending or accessing of the message.

In a first embodiment, a method for processing an electronic message is provided that includes the following steps:

(a) receiving a message from a sender, the message including one or more recipients and including a restriction identifier, the restriction identifier identifying a subset of recipients from among a set of recipients to receive the message;

(b) determining whether each identified recipient is within the subset of recipients corresponding to the restriction identifier; and (c) when an identified at least one recipient is not within the subset of recipients, one or both of (i) not providing access to the message to the identified at least one recipient who is not in the subset of recipients and (ii) notifying the sender that an identified at least one recipient is not within the subset of recipients.

The restriction identifier is preferably a flag located in any part of the electronic message. As will be appreciated, a "flag" is a variable indicating that a certain condition is in effect. The identifier can be in the header, body, trailer, and/or attachment to the message.

The steps can be performed by a server on the sender and/or recipient end of the communication (e.g., on the outgoing and/or incoming server). In a preferred configuration, the steps are performed by the outgoing server.

The restriction identifier can also refer to other conditions besides class of eligible recipients. For example, the identifier can be an age restriction specifying an age limit of the message. In that event, the message includes a timestamp indicating when a life of a message starts and the expired life of the message is compared with the age restriction to determine whether or not to deliver the message to the at least one recipient. The identifier can be a forwarding restriction indicating one or both of (a) whether or not the message may be forwarded and (b) to whom the message may be forwarded. The identifier can also be an access restriction indicating that the message may be accessed only from predefined points of access, such as points of access internal to a network.

In another embodiment, the invention provides a method for processing an electronic message including the steps of:

(a) receiving a message inputted by a user, the message including one or more intended recipients;

(b) receiving, from the user, a restriction identifier for the message, the restriction identifier identifying a subset of recipients from among a set of recipients to receive the message; and (c) when a restriction identifier is received, tagging the message with the restriction identifier.

These steps are typically performed by the outgoing server before the electronic message is forwarded to the intended recipients.

The invention can offer a number of advantages. For example, the invention can offer an effective method of controlling and monitoring the distribution of sensitive data in electronic messaging such as email or voice mail. Sensitive information will not be sent to an intended recipient if the specified restriction identifier excludes the intended recipient from the recipient subset associated with the identifier (unless the user overrules or changes the restriction identifier). In this way, accidental transmissions of sensitive information to unauthorized recipients can be obviated. For example, if a company executive marked a message as "executive team only" but accidentally tried to send the message as a broadcast announcement, the invention would remove any intended recipient who was not a member of the executive team. The invention is particularly useful in businesses where there is a need to manage the distribution of data within a company, such as to implement "Chinese wall" or "ethical wall" policies. The ability of a recipient to forward the message can also be impacted by the restriction identifier. In the previous example, a member recipient could not forward the message to someone outside of the executive team as the restriction identifier is embedded in the message. The invention provides users with the flexibility to decide on a case-by-case basis the sensitivity of the data in an electronic message and to select the proper class of recipients. System administrators also have the flexibility to configure and change distribution by group (i.e., by altering the members of the subset associated with the restriction identifier).

These and other advantages will be apparent from the disclosure of the invention(s) contained herein.

The above-described embodiments and configurations and advantages are neither complete nor exhaustive. As will be appreciated, other embodiments of the invention are possible utilizing, alone or in combination, one or more of the features set forth above or described in detail below.

DETAILED DESCRIPTION

Operating Environment

Figure 1:
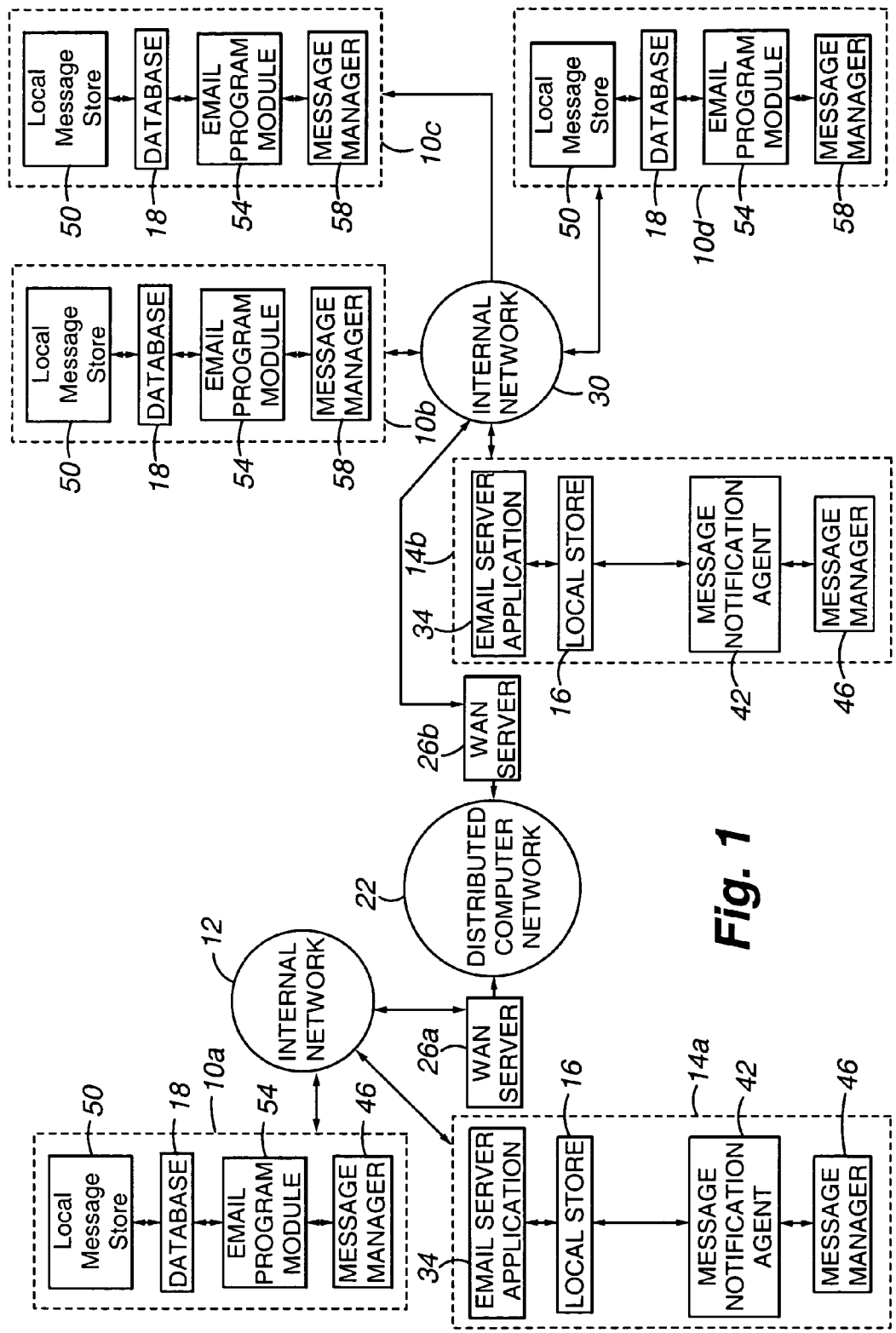
FIG. 1 is an embodiment of an architecture according to the present invention.

FIG. 1 illustrates a client-server environment in which one embodiment of the present invention operates.

A computer system ("client") 10a, such as a personal computer or any device operable to communicate over a network, is connected to a server computer ("server") 14a, which is typically a Local Area Network or LAN server (hereinafter referred to as LAN server) through an internal network 12. In typical applications, the server 14a stores files, such as e-mail, that are available to other computers connected to the LAN. For example, an e-mail server 14a manages message traffic and mail boxes for users. To obtain information from a server 14a, a client 10a makes a request for a file or information located on the server 14a using a specified protocol. As will be appreciated, the Internet uses a message standard, known as a Simple Mail Transfer Protocol (SMTP), which works in conjunction with a user's e-mail program and defines the control messages used by two computers to exchange e-mail messages. Upon reception of a properly formatted request, the server 14a downloads the file or information from a server store 16 to a database 18 located at the client. The server 14a is connected to a distributed computer network 22, such as the Internet, typically via the internal network 12 and a Wide Area Network or WAN server 26a, such as an Internet Service Provider, and enables the client 10a to communicate via the distributed computer network 22 with other computational components. As will be appreciated, WAN server 26a provides translation facilities or gateways that allow message exchange between different types of e-mail programs or applications using different messaging protocols and includes a message store for holding messages until delivery.

The client 10a communicates via the combination of the LAN server 14a, one or more WAN servers 26b, and the distributed computer network 22 to another LAN server 14b, such as a communication or an e-mail server. As shown, a WAN network server 26 is typically located between the distributed computer network 22 and each LAN server 14. The LAN server 14b is connected to an internal network 30 and enables the client 10a to communicate with clients 10b, 10c, and 10d. Clients 10b, 10c, and 10d can send information to the client 10a via the internal network 30 to the LAN server 14b. The LAN server 14b, in turn, forwards the information to the client 10a via the associated WAN server(s) 26a,b and the distributed computer network 22. The information is retrieved by the LAN server 14a and can be forwarded to the client 10a, when requested by the client 10a.

Each LAN server 14a and 14b and client 10a, 10b, 10c, and 10d includes a variety of software components. Specifically, servers 14*a* and 14*b* each include an email server application 34 (such as UNIX mail, Groupwise™ by Correl, and/or Microsoft Exchange™ by Microsoft Corporation), a local (central) message store 16 operable to store e-mail messages, a message notification agent 42 operable to receive information about messages in the local store 16 and notify a client that an e-mail message intended for the client has been received by the server 14, and a message manager 46 for managing the messages in the local store 16. The clients 10*a*, 10*b*, 10*c*, and 10*d* each include a local message store 50 containing one or more queues of notification messages from the message notification agent 42, a database 18 for archiving full text e-mail messages and storing draft email messages composed at the client, an e-mail program module 54 for interfacing with the e-mail server application 34 and providing a graphical user interface (GUI) for reading and composing email messages at the client, and a message manager 58 for managing the messages in local store 50 and/or database 18. As will be appreciated, the message manager 58 in each client 10*a*, 10*b*, 10*c*, and 10*d* can be omitted from the client. In that configuration, the message manager would reside only on servers 14*a*, 14*b* as message manager 46. The operations of the email program module 54, message notification agent 42, and message manager 56 are discussed more fully below.

Figure 2:
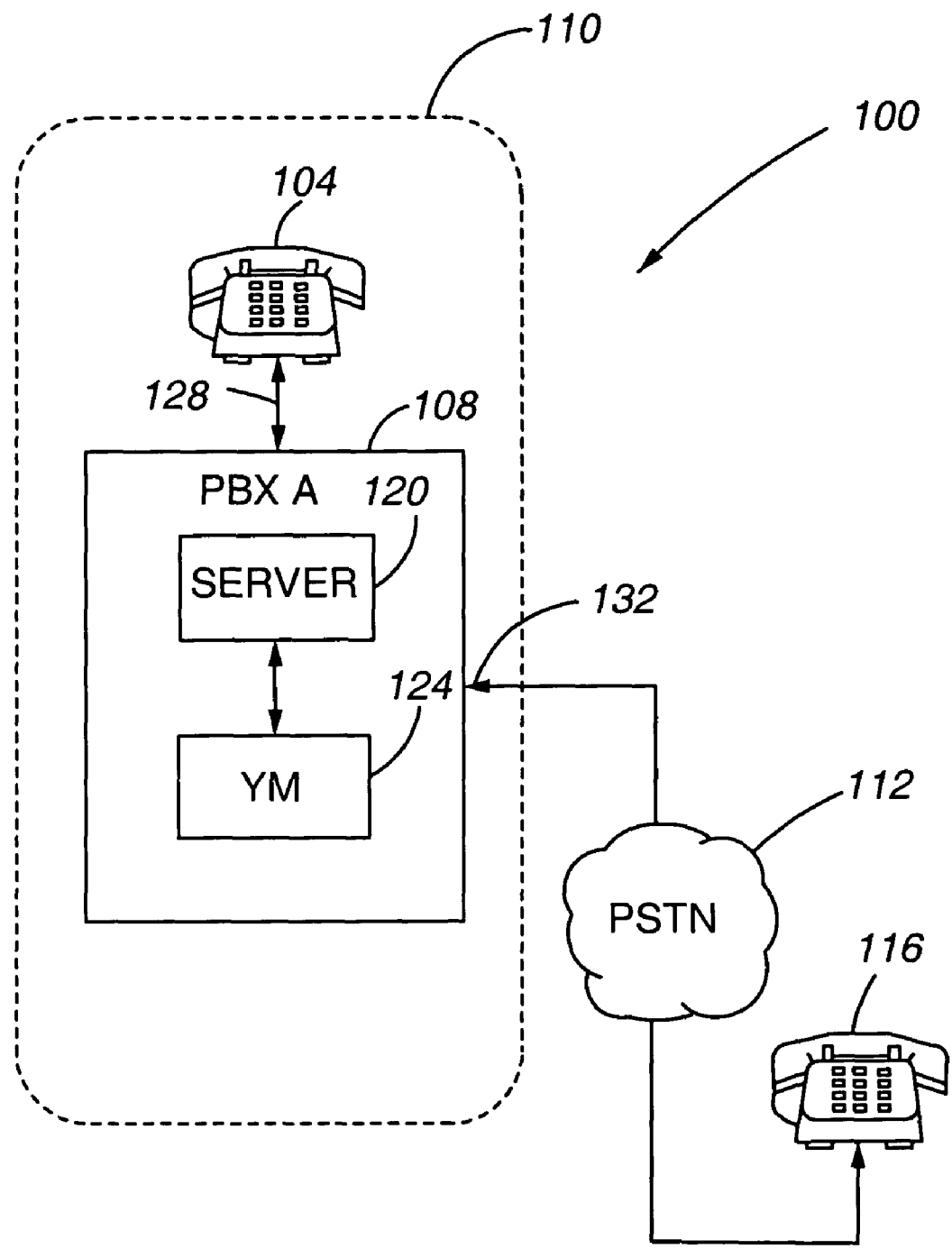
FIG. 2 is an embodiment of an architecture according to the present invention.

FIG. 2 illustrates an environment in which another embodiment of the present invention operates. A call answer voice mail system 100 comprises an internal communication device 104, such as a telephone, a softphone, or any other device allowing voice communications interconnected to a switch 108. The switch 108 and internal communication device 104 are located within an enterprise network 110, represented as a dashed line in FIG. 2. The enterprise network 110 may be located in a single facility, such as an office building, or may include multiple switches and multiple facilities associated with an enterprise. The switch 108, represented in FIG. 2 as PBX A 108, is interconnected to the public switched telephone network (PSTN) 112 and a remote communication device 116. PBX A 108 incorporates a server 120, a voice mail box (VM) 124. The server 120 and voice mail box 124 may be implemented as part of the sending switch, PBX A 108. For example, PBX A 108 may comprise a Definity® PBX or an Intuity® PBX available from the assignee of the present invention, modified to incorporate the functions of the server 108 and voice mail box 124 described herein.

The internal communication device 104 may comprise any device allowing voice communications, such as a telephone or a soft phone implemented as part of a general purpose computer, operatively interconnected to PBX A 108. For example, the internal communication device 104 may be interconnected to PBX A 108 by a real time quality voice communication packet data link 128. The remote communication device, may comprise any device allowing voice communications, such as a telephone or a soft phone implemented as part of a general purpose computer, operatively interconnected to PSTN 112. PBX A includes a remote voice mail access port 132, which has an associated telephone number and may be dialed by the remote communication device to provide remote access to the voice mail box 124.

Operation of the Message Manager

Figure 3:
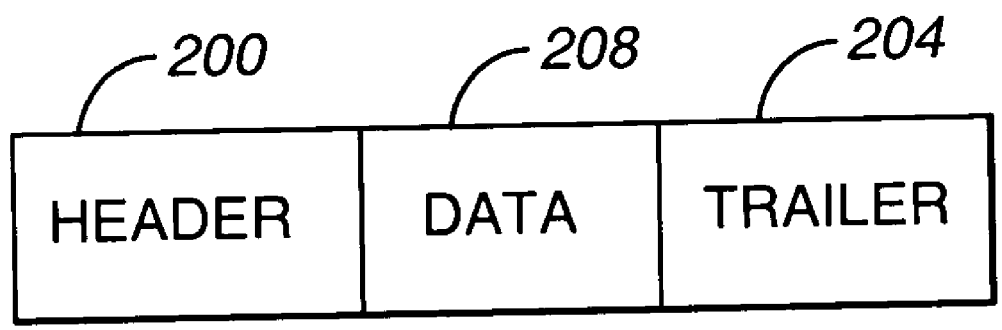
FIG. 3 is an embodiment of a message according to the present invention.

In the embodiment of FIG. 1, the security of email messages is enhanced through restriction identifiers or flags which are set prior to an email originator sending an email. This can be done by entering the security restriction as a flag value (or setting the flag to a value related to the age limit) in the header 200, trailer 204, or body 208 (FIG. 3) of the message. If the security restriction is entered as a flag value in the header, the security restriction can be placed in the "X" field or extra flag field of the message header. This field is in most email messaging protocols. The security restriction, as will be readily understood by one of skill in the art, may be located in any part of the message. In one embodiment, the security restriction is encrypted, thus making the restriction difficult to circumnavigate.

The security restriction may be one of a number of restrictions placed on the viewing and/or the forwarding of the message content to other users. A security restriction on the viewing of an email may restrict viewing only to clients 10*b*, 10*c*, 10*d*, which are interconnected to the LAN server 14*b* through the internal network 30. A client 10*a* which is interconnected to the LAN server 14*b* through the distributed computer network 22 is restricted from viewing the email message. This restricts the viewing of the email to only internal clients 10*b*, 10*c*, 10*d*, which reduces the likelihood that an unauthorized person will see the email content when the unauthorized access is gained through the distributed computer network 22. Such a security restriction thus reduces the likelihood of an unauthorized user gaining access to the system and viewing sensitive content in the email messages.

A second type of security restriction that an email originator may place on an email message is a limitation on whether the email may be forwarded, and to whom it the email may be forwarded. The restriction may not allow forwarding the email at all, or may allow forwarding to users in a predefined group of people. The originator of the email selects the level of the restriction when generating the email. In this manner, an email containing sensitive information is more tightly controlled by limiting the forwarding of the email content. Such a restriction also limits the inadvertent forwarding of a sensitive email message. For example, a user may read or create an email containing sensitive information, and wish to forward the email to another user, or group of users, authorized to access the information contained therein. However, the sending user may inadvertently select an incorrect recipient, or group of recipients, when addressing the email. The restriction contained in the email would automatically remove any unauthorized recipients to whom the email is addressed. In one embodiment, the message manager 58 generates a notification to the sending user that one or more of the recipients of the email did not receive the email because they were not authorized to view such an email.

Another type of restriction is an age restriction. A sender at client 10*a*, when generating the email, determines a selected life or age limit of the email message. An example of such an age limit is where the message content is a time sensitive issue, such as a time for a meeting. After a certain period of time, the message is no longer of interest to the recipient. The sender can thus limit the life of the message as desired to accommodate such situations. The restriction may also include an age limit which, after the message is read, auto-deletes the message after a preset time period selected by the sender (e.g. 1 hour).

Figure 4:
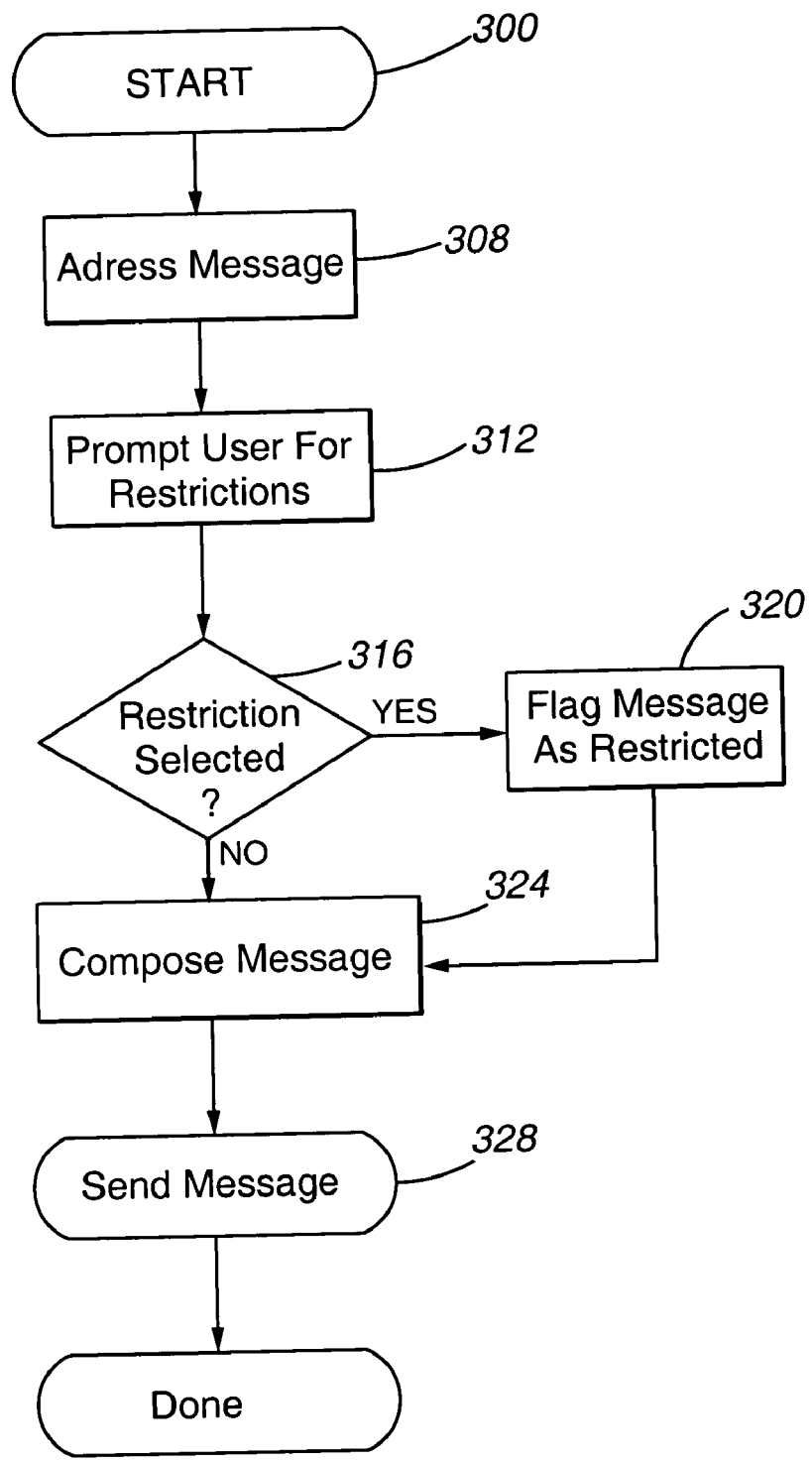
FIG. 4 is an operational embodiment of the message manager.

Referring now to FIG. 4, the operational steps preformed by the message manager 58 are now described for the creation of the message. Initially, the message manager is initialized, as indicated at block 300. At block 308, the message is addressed using one of many widely known techniques for addressing email messages, including selecting one or more addresses from an address book or directory, typing in one or more addresses, selecting a predefined group of users from the address book or directory, and/or typing an address which includes a predefined number of users as recipients. At block 312, the user is prompted for restrictions to the email.

The prompt may include any or all of the restrictions described above, and provide a field for entering information related to the restriction. For example, the prompt may include an entry for selecting a viewing restriction that restricts viewing only to clients which are interconnected directly to the internal computing network, thus restricting the viewing of such a message to any client accessing the LAN server from the distributed computing network.

The prompt may also include an entry for selecting a restriction which allows the message to only be sent to a defined user or group of users, allowing the user originating the message to select users using a routine similar to the routine for addressing messages. The prompt may include an entry for selecting a restriction which allows the message to only be sent to users having a predefined access clearance of a specified level. For example, a manager may have an access clearance of three, and a lower level employee may have an access clearance of six. The user originating the email may select an access clearance for the message of three, thus restricting anyone with a higher access level from receiving the message.

At block 316, it is determined if a restriction is selected. If a restriction was selected, the message is flagged as restricted, as noted at block 320. At block 324, the message body is composed, and the message is sent according to block 328. It will be understood that the order of the operational steps illustrated in FIG. 4 are for purposes of illustration, and that other orders of the operational steps may be utilized, two or more of the operational steps may be combined, and that each operational step may include additional sub-steps.

Figure 5:
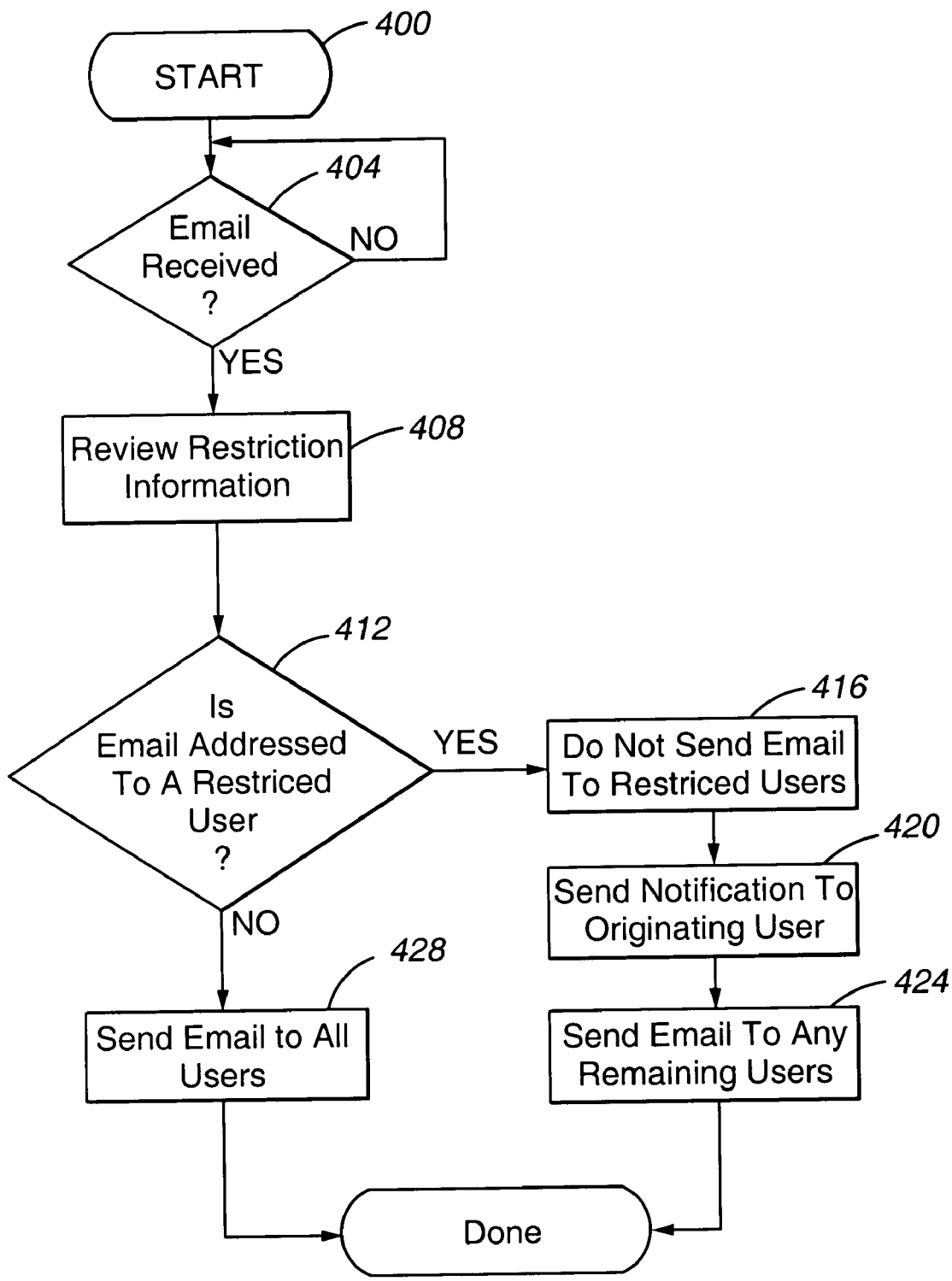
FIG. 5 is another operational embodiment of the message manager.

Referring now to FIG. 5, the operation of the message manager 46 on the LAN server 14b is now described for messages sent from client computers. Initially, as noted at block 400, the routine is started. At block 404, it is determined if an email is received. When an email is received, the e-mail server reviews the restriction information associated with the message, according to block 408. At block 412, it is determined whether the email is addressed to a restricted user. If the email is addressed to a restricted user, the email is not sent to the restricted user, as indicated at block 416. A notification is sent to the originating user that the email was addressed to a restricted user, according to block 420. The email is, at block 424, sent to any remaining users. If it is determined at block 412 that the email is not addressed to any restricted users, the email is sent to all users, according to block 428.

Figure 6:
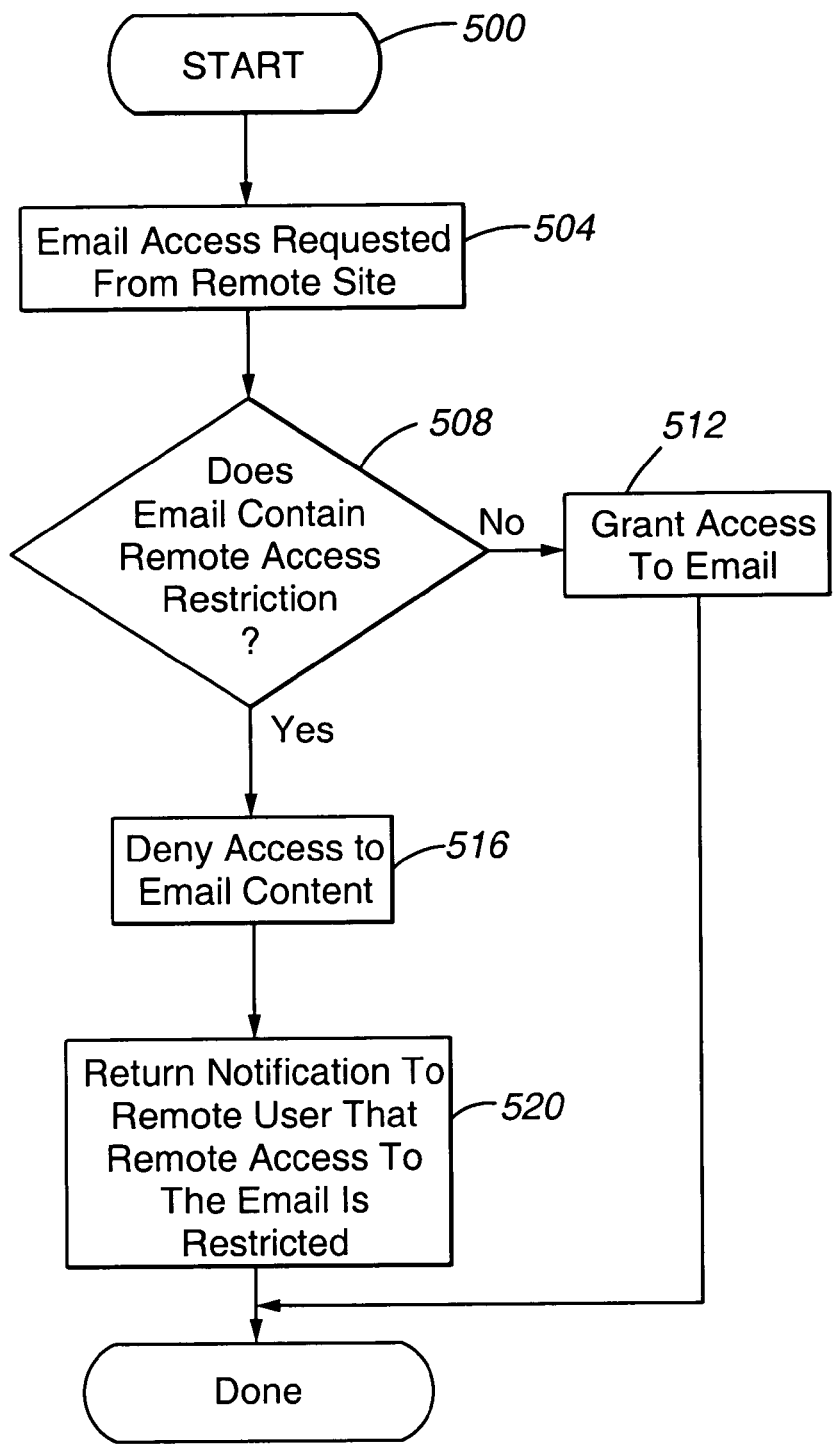
FIG. 6 is yet another operational embodiment of the message manager.

Referring now to FIG. 6, the operation of the message manager 46 on the LAN server 14b is described when access to email messages is requested through the distributed computing network. Initially, as noted at block 500, the routine is started. At block 504, email access is requested from a remote client through the distributed computing network. The LAN server determines that the access is through the distributed computing networks according to well known techniques, such as by a remote access port through which the request comes, the IP address of the requesting client, etc. At block 508, the e-mail server determines if the requested email message contains a remote access restriction. If the email does not contain a remote access restriction, access is granted to the email, as noted at block 512. If the email message does contain a remote access restriction, access to the email message content is denied, as noted at block 516. The e-mail server returns a notification to the remote user that remote access to the email is restricted, according to block 520. In one embodiment, the e-mail server contains a list of remote access users which are authorized to access email. The e-mail server compares the IP address, or other source identifying information, of the remote client to the list of remote access users, and grants access to email messages when the remote client is included in the list.

Figure 7:
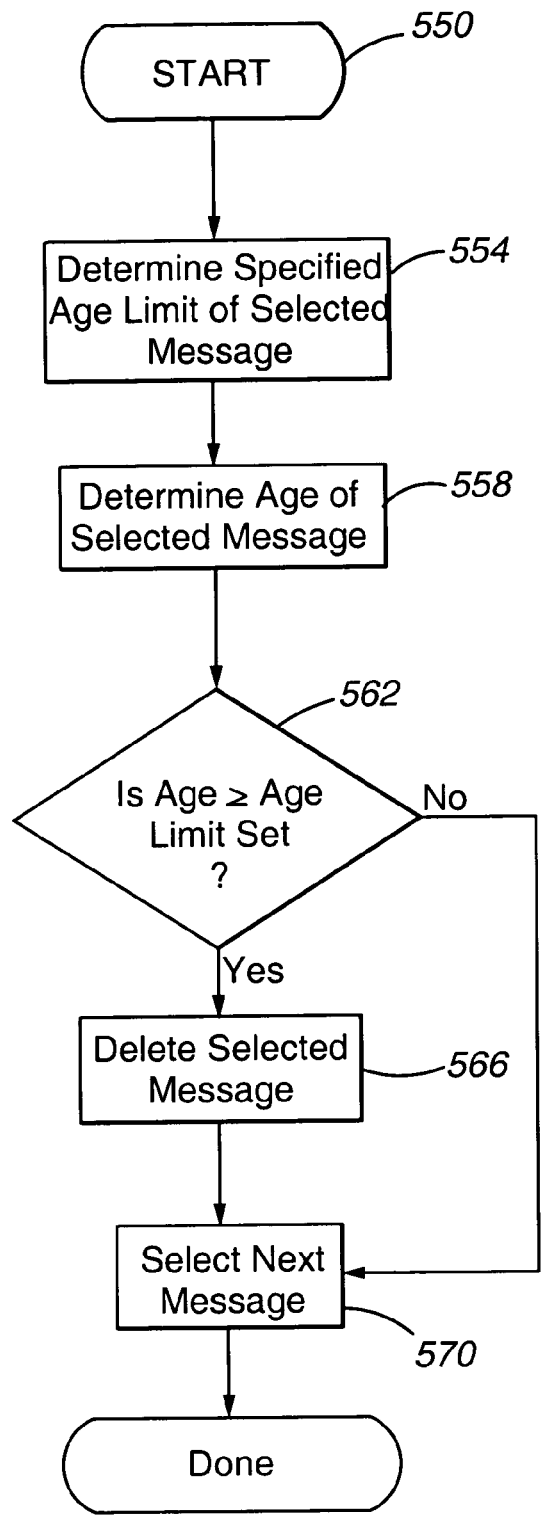
FIG. 7 is yet another operational embodiment of the message manager.

With reference now to FIG. 7, the operational steps of the message manager when an age restriction is included in an email is now described. Initially, the routine starts, according to block 550. The message manager determines the specified age limit (if any) of the email message at block 554. At block 558, the age of the selected message (based on the timestamp of denoting the time of receipt of the message) is determined. The specified age limit is typically identified by parsing the header if the age limit is present as a flag in the header, or by examining the text (including attachment) of the message for a flag and/or connectors associated therewith.

When an age limit is specified, the message manager in block 562 determines if the specified age limit of the message is equal to or less than the actual age of the message. If the specified age limit has been met or exceeded by the actual age, the message manager deletes the selected message, according to block 566. If the specified age limit has not been met or exceeded or after block 566, the message manager selects a next message in the local store and repeats the foregoing steps. As will be appreciated, when a message has no specified age limit, the actual age is considered to be less than the specified age limit.

Operation of the Voice Mail Server

In the embodiment of FIG. 2, the security of voice mail messages is enhanced through flags which are set when a calling party leaves a voice mail message for a called party. This is done, in one embodiment, by entering a security restriction as a flag value (or setting the flag to a value related to the security restriction) in the header 200, or trailer 204, (FIG. 3) of the message. This may be done through predefined prompts to the calling party when leaving a voice mail message which may place restrictions on the accessibility of messages.

Similarly as described above with respect to email security restrictions, the voice mail security restriction may be one of a number of restrictions placed on the accessing and/or the forwarding of the message content to other users. A security restriction on the accessing and playing of a voice mail may restrict playing only to an internal communication device 104 interconnected to PBX A 108 through the data link 128. A remote communication device 116 which is interconnected to PBX A 108 through the PSTN 112 is restricted from playing the voice mail message. This restricts the retrieval of the voice mail to only communication devices attached directly to the local/internal PBX, which reduces the likelihood that an unauthorized person can gain access to sensitive information when the unauthorized access is gained through the PSTN 112. In one embodiment, the server 120 contains a list of authorized access numbers on the PSTN 112. When access is requested, identification information (caller ID) included with the call from the remote communication device 116 is compared with the authorized access numbers, and when the identification is included in the authorized list, access to the system is allowed on the same level as that of an internal communication device 104.

A second type of security restriction that a voice mail originator may place on a message is a limitation on whether the voice mail may be forwarded, and to whom it may be forwarded. The restriction may not allow forwarding at all, or may allow forwarding to users in a predefined group of people. The originator of the voice mail selects the level of the restriction when generating the voice mail. In this manner, a voice mail containing sensitive information is more tightly controlled by limiting the forwarding of the message. Such a restriction also limits the inadvertent forwarding of a sensitive voice mail message.

Another type of restriction is an age restriction, similar to the age restriction described above. A calling party when generating the voice mail, determines a selected life or age limit of the message. An example of such an age limit is where the sender has a time sensitive issue, such as a time for a meeting, in the message. After a certain period of time, the message is no longer of interest to the recipient. The calling party can thus limit the life of the message as desired to accommodate such situations. Another example of age limit is to automatically delete a message after a certain period of time after the message was read (e.g., 1 hour). This reduces the chance that a sensitive voice mail will fall into the wrong hands even if the security of the voice mail system is compromised.

Figure 8:
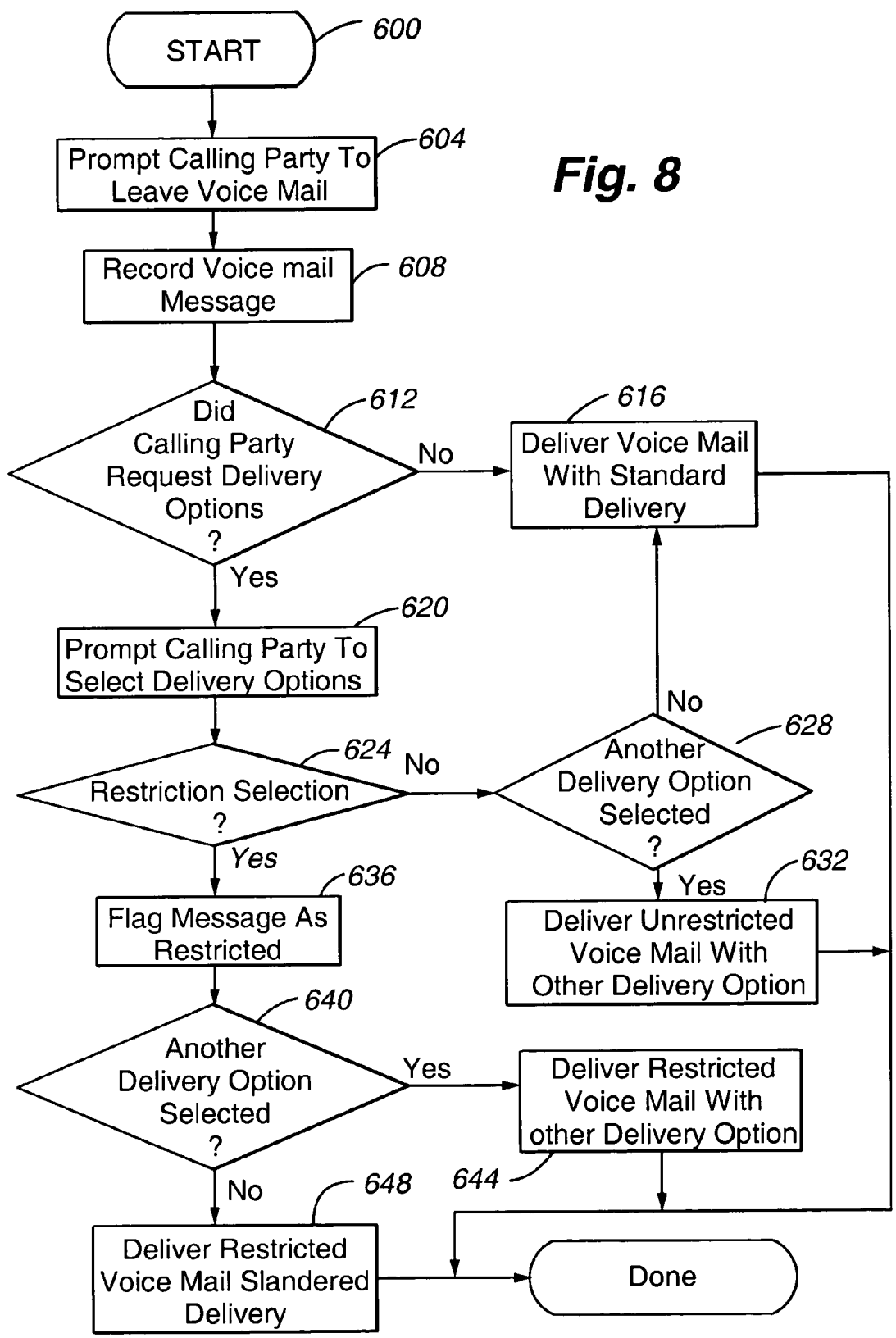
FIG. 8 is yet another operational embodiment of the message manager.

Referring now to FIG. 8, the operational steps preformed by the server when recording a voice mail message are now described. Initially, the server is initialized, as indicated at block 600. At block 604, the calling party if prompted to leave a voice mail message. The prompt may also indicate that the calling party may select delivery and/or security options for the voice mail message. At block 608, the calling party records the voice mail message. The server determines, at block 612, whether the calling party requested any delivery or security options. This may be done, for example, by depressing a preset key on the communication device, such as the pound (#) key when the calling party is done recording the message. If the calling party did not request any delivery or security options, the voice mail message is delivered with standard delivery, as indicated at block 616. If delivery options were requested, the server prompts the calling party to select delivery options, according to block 620.

The server, after prompting the calling party to select a delivery or security option, determines if a restriction was selected, noted at block 624. If a restriction was not selected, it is determined at block 628 if another delivery option was selected. If another delivery option was not selected, the voice mail message is delivered with standard delivery, according to block 616. If another delivery option (such as message priority) was selected at block 628, the message is delivered as an unrestricted voice mail message with the other delivery option, according to block 632. If, at block 624, a restriction was selected, the server flags the message as restricted, with the appropriate restriction flag(s) and information. The server, at block 640, determines if another delivery option is selected. If another delivery option is selected, the voice mail is delivered with the other delivery option as a restricted message. If another delivery option is not selected at block 640, the message is delivered as a restricted voice mail with standard delivery.

Figure 9:
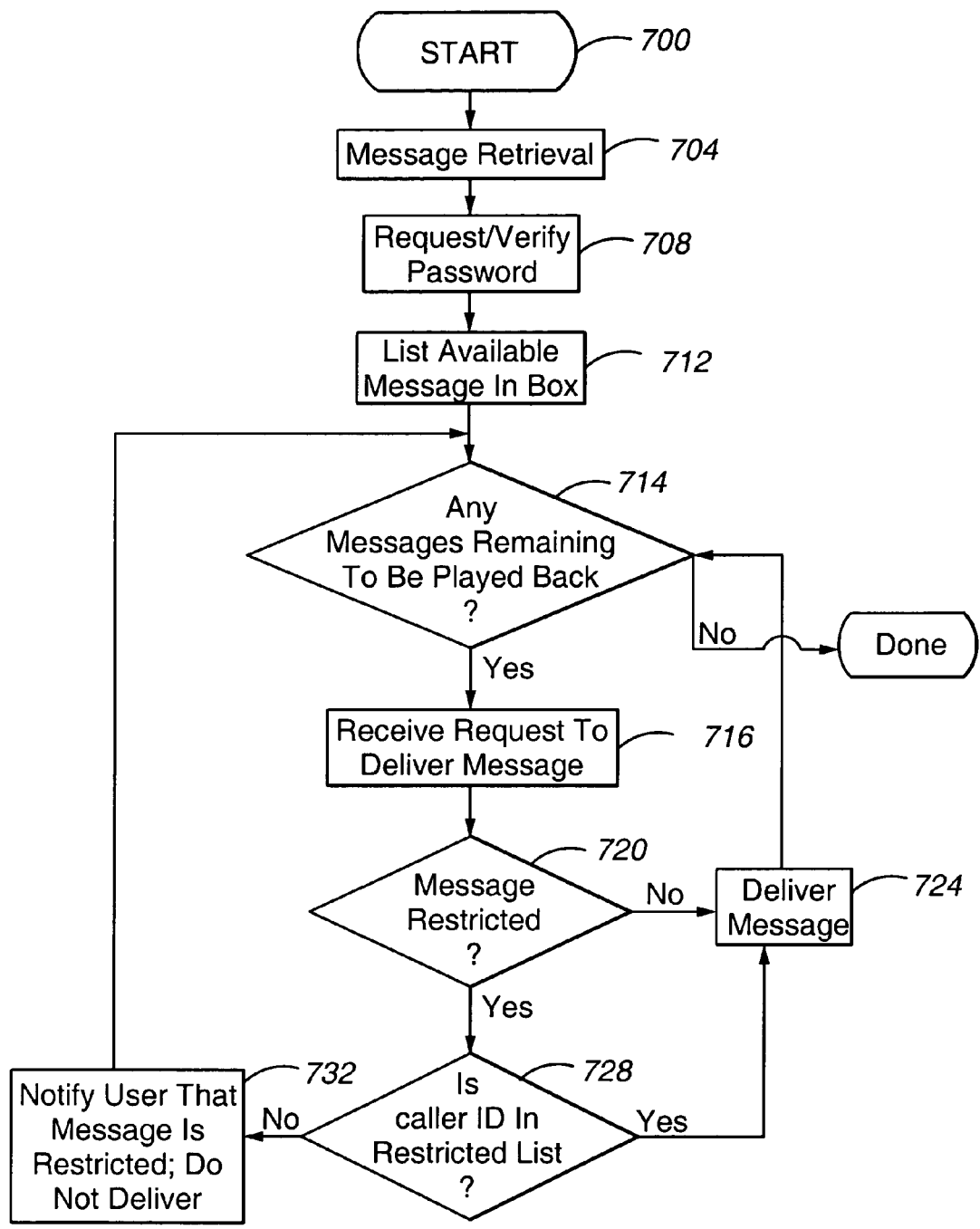
FIG. 9 is yet another operational embodiment of the message manager.

Referring to FIG. 9, the operation when a called party accesses the system to retrieve voice mail messages is now described. Initially, at block 700, the routine is initialized. At block 704, the user requests message retrieval for messages in a voice mail box. The user is authenticated by requesting and verifying a password, according to block 708. When the authentication is complete, available messages are listed to the user, as noted by block 712. At block 714, the system determines if any messages are remaining in the voice mail box to be played back. If no messages are in the voice mail box, the routine is ended, according to block 715. The voice mail system, at block 716, receives a request to deliver a message. It is determined, at block 720, whether the message is restricted. If the message is not restricted, it is delivered, as noted at block 724, and the steps of blocks 714 through 720 are repeated. If the message is restricted, the identification of the access device is determined. As mentioned above, the identification of the access device may simply be identifying the access device as an internal or external communication device, or may be from a list of defined caller ID information. The identification of the access device may also be based on trunk routing, with calls over specified trunks allowed, and calls over other trunks not allowed. At block 728, it is determined whether the access device ID is in the allowed ID list. If the access device ID is not in the list, or the call is from a restricted location, the message is not delivered, as noted by block 732, and the user is notified that the message is restricted. If the access device ID is in the allowed ID list or the call is from an unrestricted location, the message is delivered according to block 724, and the steps of blocks 714 through 732 are repeated.

Figure 10:
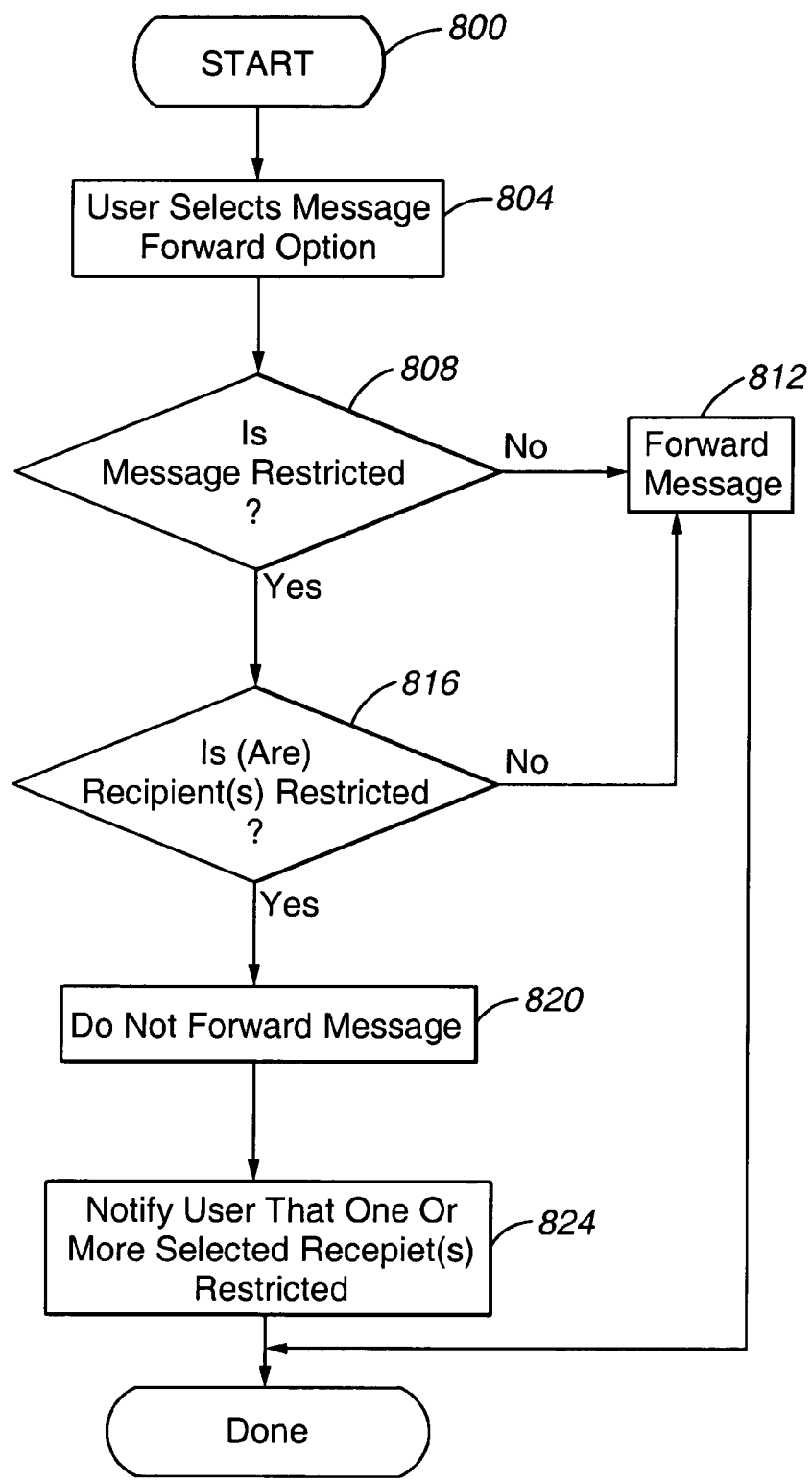
FIG. 10 is yet another operational embodiment of the message manager.

The operation of the voice mail server when a user requests to forward a voice mail message is now described with reference to FIG. 10. Initially, the routine is initiated, as noted at block 800. At block 804, the user selects a message forward option. The server determines, at block 808, whether the message is restricted with respect to forwarding. If the message is not restricted, the message is forwarded, according to block 812. If the message is restricted, it is determined at block 816 if the selected recipient(s) of the forwarded message is(are) restricted. If the recipient is not restricted, the message is forwarded, as noted at block 812. If the recipient is restricted, the message is not forwarded to the recipient, according to block 820, and the user is notified that the selected recipient is restricted as noted at block 824.

Figure 11:
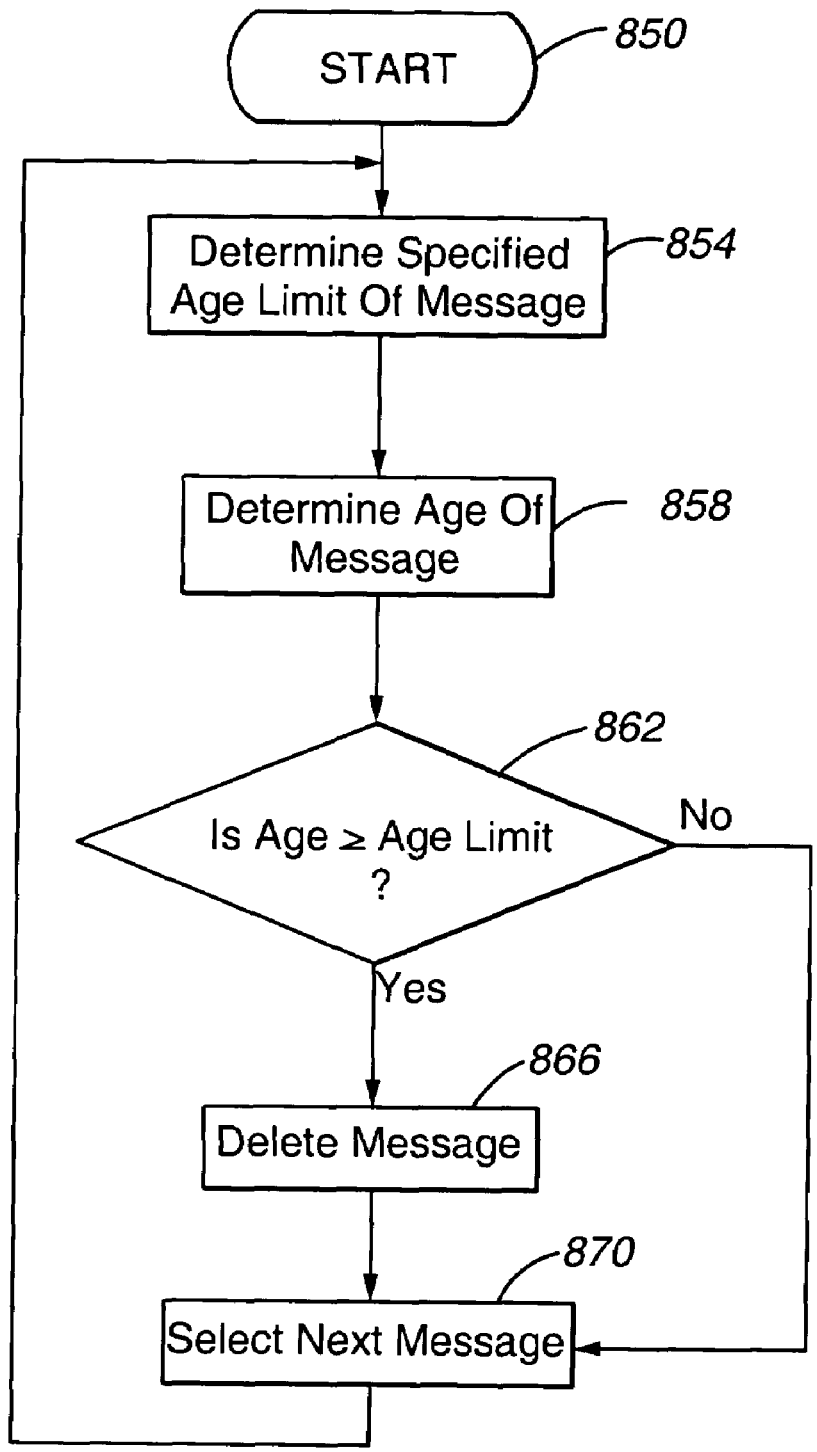
FIG. 11 is yet another operational embodiment of the message manager.

The operation of the server when an age restriction is selected for a voice mail message is now described with reference to FIG. 11. At block 850, the routine is initialized. The voice mail server determines the specified age limit (if any) of the voice mail message at block 854. At block 858, the age of the message (based on the timestamp of denoting the time of receipt of the message) is determined. The specified age limit could be identified by parsing information in the header if the age limit is present as a flag in the header. As will be understood by one of skill in the art, alternative methods for storing this information may also be used, and set by the sender, with each individual message.

When an age limit is specified, the server at block 862 determines if the specified age limit of the message is equal to or less than the actual age of the message. If the specified age limit has been met or exceeded by the actual age, the voice mail server deletes the message, according to block 866. If the specified age limit has not been met or exceeded or after block 866, the server selects a next message in the voice mail box and repeats the foregoing steps. As will be appreciated, when a message has no specified age limit, the actual age is considered to be less than the specified age limit.

A number of variations and modifications of the invention can be used. It would be possible to provide for some features of the invention without providing others.

For example, one or more of the algorithms described herein can be used with any suitable network topology, such as a client/server or peer-to-peer network, a connection-oriented or connectionless network, and/or a synchronous or asynchronous network.

While the invention is described with reference to an application program that runs on an operating system in conjunction with a personal computer and in connection with a server, those skilled in the art will recognize that the invention also may be implemented in combination with other program modules. Generally, program modules include routines, operating systems, application programs, components, data structures, etc., that perform particular tasks or implement particular abstract data types.

Those skilled in the art will appreciate that the invention may be practiced with other computer system configurations, including hand-held devices, multiprocessor systems, microprocessor-based or programmable consumer electronics, minicomputers, mainframe computers, and the like.

The invention may also be practiced in distributed computing environments where tasks are performed by remote processing devices that are linked through a communications network. In a distributed computing environment, program modules can be located in both local and remote memory storage devices. Execution of program modules can occur locally in a stand-alone manner or remotely in a client/server or peer-to-peer manner. Examples of such distributed computing environments include local area networks of an office, enterprise-wide computer networks, and the Internet.

The invention may be practiced with computational components using a variety of operating systems, protocols, and/or network applications. For example, the clients and/or servers can use UNIX mail (which is defined by SMTP), and Eudora (which is defined by Post Office Protocol or POP).

The invention may be practiced with other electronic text messaging applications, such as instant messaging.

The invention may be embodied in whole or part as a logic circuit, such as an application specific integrated circuit or ASIC and/or software.

The present invention, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for processing an electronic message, comprising:
   receiving a message from a sender, the message comprising at least one recipient to receive the message and including at least one of a restriction identifier, the restriction identifier identifying a subset of recipients from among a set of possible recipients and an access restriction indicating a subset of points of access from among a set of points of access to access the message, wherein the message further comprises an age restriction, the age restriction specifying an age limit of the message;
   determining whether each identified at least one recipient is within the subset of recipients corresponding to the restriction identifier; and wherein at least one of the following steps is performed:
      (i) when the message comprises the restriction identifier and an identified at least one recipient is not within the subset of recipients, at least one of not providing access to the message to the identified at least one recipient who is not in the subset of recipients and notifying the sender that an identified at least one recipient is not within the subset of recipients; and
      (ii) when the message comprises the access restriction and an identified at least one recipient attempts to access the message from a point of access not within the subset of points of access, not providing access to the message to the identified at least one recipient whose point of access is not within the subset of points of access.

2. The method of claim 1, wherein the message comprises the restriction identifier and the restriction identifier is located in a header of the message.

3. The method of claim 1, wherein the message comprises the restriction identifier and the restriction identifier is located in a body of the message.

4. The method of claim 1, wherein the message comprises the restriction identifier and the restriction identifier is located in a trailer of the message.

5. The method of claim 1, wherein the message comprises the restriction identifier and the restriction identifier is located in an attachment to the message.

6. The method of claim 1, wherein the message is received by a server associated with at least one recipient from a server associated with the sender.

7. The method of claim 1, wherein the at least one of the restriction identifier and an access identifier is configured as a flag.

8. The method of claim 1, wherein the message comprises the restriction identifier and wherein, when an identified at least one recipient is not within the subset of recipients, the step of not providing access to the message to the identified at least one recipient who is not in the subset of recipients is performed.

9. The method of claim 1, wherein the message comprises the restriction identifier and wherein, when an identified at least one recipient is not within the subset of recipients, the step of notifying the sender that an identified at least one recipient is not within the subset of recipients is performed.

10. The method of claim 1, wherein the message comprises a timestamp indicating when a life of a message starts and further comprising:
    comparing the expired life of the message with the age restriction to determine whether or not to delete and/or deliver the message to the at least one recipient.

11. The method of claim 1, wherein the message comprises a forwarding restriction indicating at least one of (a) whether the message may be forwarded and (b) to whom the message may be forwarded.

12. The method of claim 1, wherein the message comprises the access restriction.

13. A computer readable medium operable to perform the steps of claim 1.

14. A logic circuit operable to perform the steps of claim 1.

15. A method for processing an electronic message, comprising:

receiving at least part of a message inputted by a user, the at least part of a message comprising at least one recipient to receive the message, wherein the message further comprises an age restriction, the age restriction specifying an age limit of the message;

receiving, from the user, a restriction identifier for the at least part of a message, the restriction identifier identifying a subset of recipients from among a set of possible recipients; and when a restriction identifier is received, tagging the message with the restriction identifier.

16. The method of claim 15, wherein, before the message is sent to the at least one recipient, further comprising:

determining whether each identified at least one recipient is within the subset of recipients corresponding to the restriction identifier; and when an identified at least one recipient is not within the subset of recipients, at least one of not sending the message to the identified at least one recipient who is not in the subset of recipients and notifying the user that an identified at least one recipient is not within the subset of recipients.

17. The method of claim 15, wherein the restriction identifier is located in a header of the message.

18. The method of claim 15, wherein the restriction identifier is located in a body of the message.

19. The method of claim 15, wherein the restriction identifier is located in a trailer of the message.

20. The method of claim 15, wherein the restriction identifier is located in an attachment to the message.

21. The method of claim 16, wherein the message is received by a server associated with at least one recipient from a server associated with the sender.

22. The method of claim 16, wherein the restriction identifier is configured as a flag.

23. The method of claim 16, wherein, when an identified at least one recipient is not within the subset of recipients, the step of not providing access to the message to the identified at least one recipient who is not in the subset of recipients is performed.

24. The method of claim 16, wherein, when an identified at least one recipient is not within the subset of recipients, the step of notifying the sender that an identified at least one recipient is not within the subset of recipients is performed.

25. The method of claim 16, wherein the message comprises a timestamp indicating when a life of a message starts and further comprising:

comparing the expired life of the message with the age restriction to determine whether or not to delete and/or deliver the message to the at least one recipient.

26. The method of claim 16, wherein the message comprises a forwarding restriction indicating at least one of (a) whether the message may be forwarded and (b) to whom the message may be forwarded.

27. The method of claim 16, wherein the message comprises an access restriction indicating a subset of points of access from among a set of points of access to access the message, and further comprising:

when an identified at least one recipient attempts to access the message from a point of access not within the subset of points of access, not providing access to the message to the identified at least one recipient whose point of access is not within the subset of points of access.

28. A computer readable medium operable to perform the steps of claim 15.

29. A logic circuit operable to perform the steps of claim 15.

30. A server for processing an electronic message, comprising:

an input operable to receive at least part of a message inputted by a user, the at least part of a message comprising at least one recipient to receive the message, and a restriction identifier for the at least part of a message, the restriction identifier identifying a subset of recipients from among a set of possible recipients, wherein the message further comprises an age restriction, the age restriction specifying an age limit of the message; and when a restriction identifier is received, a processor operable to tag the message with the restriction identifier.

31. The server of claim 30, wherein, before the message is sent to the at least one recipient, the processor is further operable to determine whether each identified at least one recipient is within the subset of recipients corresponding to the restriction identifier and, when an identified at least one recipient is not within the subset of recipients, at least one of not send the message to the identified at least one recipient who is not in the subset of recipients and notify the sender that an identified at least one recipient is not within the subset of recipients.

32. The server of claim 30, wherein the restriction identifier is located a header of the message.

33. The server of claim 30, wherein the restriction identifier is located in a body of the message.

34. The server of claim 30, wherein the restriction identifier is located in a trailer of the message.

35. The server of claim 30, wherein the restriction identifier is located in an attachment to the message.

36. The server of claim 30, wherein the message is received by a server associated with at least one recipient from a server associated with the sender.

37. The server of claim 30, wherein the restriction identifier is configured as a flag.

38. The server of claim 30, wherein, when an identified at least one recipient is not within the subset of recipients, the function of not providing access to the message to the identified at least one recipient who is not in the subset of recipients is performed.

39. The server of claim 30, wherein, when an identified at least one recipient is not within the subset of recipients, the function of notifying the sender that an identified at least one recipient is not within the subset of recipients is performed.

40. The server of claim 30, wherein the message comprises a timestamp indicating when a life of a message starts and the processor is further operable to compare the expired life of the message with the age restriction to determine whether or not to delete and/or deliver the message to the at least one recipient.

41. The server of claim 30, wherein the message comprises a forwarding restriction indicating at least one of (a) whether the message may be forwarded and (b) to whom the message may be forwarded.

42. The server of claim 30, wherein the message comprises an access restriction indicating a subset of points of access from among a set of points of access to access the message, and wherein, before allowing access to the message by the at least one recipient, the processor is operable to determine point of access of the at least one recipient and, when the point of access of the at least one recipient is not within the subset of points of access, not allowing access to the message.

* * * * *

UNITED STATES PATENT AND TRADEMARK OFFICE
CERTIFICATE OF CORRECTION

PATENT NO.       : 7,590,693 B1                                    Page 1 of 1
APPLICATION NO.  : 10/622982
DATED            : September 15, 2009
INVENTOR(S)      : Chan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1764 days.

Signed and Sealed this

Twenty-first Day of September, 2010

David J. Kappos
*Director of the United States Patent and Trademark Office*